(12) United States Patent
Kniess et al.

(10) Patent No.: US 7,202,288 B2
(45) Date of Patent: Apr. 10, 2007

(54) LASER-MARKABLE PIGMENTS CONTAINING AN ABSORBER COATED WITH A MARKER

(75) Inventors: Helge Bettina Kniess, Weiterstadt (DE); Gerhard Pfaff, Muenster (DE); Matthias Kuntz, Seeheim-Jugenheim (DE); Hans-Juergen Brehm, Lindenfels (DE); Reiner Delp, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 402 days.

(21) Appl. No.: 10/701,176

(22) Filed: Nov. 5, 2003

(65) Prior Publication Data

US 2004/0157975 A1    Aug. 12, 2004

(30) Foreign Application Priority Data

Nov. 6, 2002  (DE) .............................. 102 52 007

(51) Int. Cl.
  *B32B 5/22* (2006.01)
  *B32B 5/30* (2006.01)
  *B32B 15/09* (2006.01)
  *B32B 19/02* (2006.01)
  *C08K 5/59* (2006.01)

(52) U.S. Cl. ............... 523/200; 523/216; 524/404; 524/409; 524/416; 524/442; 428/403; 428/407

(58) Field of Classification Search ............. 106/481, 106/286.4; 524/404, 409, 416, 442; 523/200, 523/216; 428/403, 407
See application file for complete search history.

(56) References Cited

U.S. PATENT DOCUMENTS

| | | | | |
|---|---|---|---|---|
| 5,053,440 A | * | 10/1991 | Schueler et al. | 523/137 |
| 5,206,280 A | * | 4/1993 | Williams | 524/409 |
| 6,214,917 B1 | * | 4/2001 | Linzmeier et al. | 524/430 |
| 6,306,493 B1 | * | 10/2001 | Brownfield | 428/327 |
| 6,376,577 B2 | * | 4/2002 | Kniess et al. | 523/215 |
| 6,521,688 B1 | * | 2/2003 | Linzmeier et al. | 524/430 |
| 6,545,065 B2 | * | 4/2003 | Solms et al. | 523/171 |
| 6,617,515 B1 | * | 9/2003 | Yeung | 174/112 |
| 6,706,785 B1 | * | 3/2004 | Fu | 523/200 |
| 6,727,308 B2 | * | 4/2004 | Kniess et al. | 524/437 |
| 6,776,835 B2 | * | 8/2004 | Andes et al. | 106/415 |
| 6,924,077 B2 | * | 8/2005 | Delp et al. | 430/270.1 |
| 2001/0021731 A1 | * | 9/2001 | Kniess et al. | 523/215 |
| 2001/0030179 A1 | * | 10/2001 | Knieb et al. | 219/121.69 |
| 2002/0082320 A1 | * | 6/2002 | Sarkis et al. | 523/220 |
| 2002/0107305 A1 | * | 8/2002 | Edler | 523/171 |
| 2002/0155291 A1 | * | 10/2002 | Daga et al. | 428/375 |
| 2002/0192448 A1 | * | 12/2002 | Schoen et al. | 428/216 |
| 2003/0209169 A1 | * | 11/2003 | Andes et al. | 106/415 |
| 2004/0003758 A1 | * | 1/2004 | Bruckner et al. | 106/415 |
| 2005/0120917 A1 | * | 6/2005 | Ruger et al. | 106/415 |
| 2006/0046057 A1 | * | 3/2006 | Huber et al. | 428/404 |

* cited by examiner

Primary Examiner—Vasu Jagannathan
Assistant Examiner—Sandra Poulos

(57) ABSTRACT

Laser-markable pigments which are distinguished by the fact that an absorber is coated with a marker and optionally with a diffusion barrier are described. Further, processes for the preparation of the laser-markable pigments and methods for using them are described. The absorber is preferably an inorganic pigment or a filler. The marker is preferably an intrinsically laser-markable polymer, particularly a polyethylene terephthalate, acrylonitrile-butadiene-styrene, polystyrene, polyphenylene ether, liquid-crystal polymer or polyphenylene sulfide.

11 Claims, No Drawings

LASER-MARKABLE PIGMENTS CONTAINING AN ABSORBER COATED WITH A MARKER

The present invention relates to laser-markable pigments which are distinguished by the fact that an absorber is coated with a marker and optionally with a diffusion barrier.

The use of laser radiation for marking plastics is increasing in importance. This is associated with a number of reasons. This technique allows large amounts of data to be applied to products in compressed form, for example in the form of bar codes. The information stored there can be called up again at any time using laser scanners in order in this way to ensure precise monitoring of production and sales processes. Labelling of non-planar surfaces, which is virtually impossible to achieve with conventional labeling methods, is also possible. In addition, the laser marks prove to be counterfeiting-proof since they are in the plastic product itself and are therefore durable and abrasion-resistant.

Many plastics can only be laser-marked with difficulty or not at all. These include many common plastics, such as, for example, polyethylene (PE), polypropylene (PP), polyamide (PA), polymethyl methacrylate (PMMA), polyoxymethylene (POM), polyurethane (PU) and polyester. Thus, laser irradiation of polyolefins, even at very high power, only produces a weak, virtually illegible mark, since the absorption coefficient of the plastics to be processed is not sufficiently high at these wavelengths in order to induce a color change in the polymeric material. The plastic must not completely reflect or transmit the laser light since no interaction would then arise. On the other hand, the absorption must also not be too strong since in this case plastic vaporizes and an engraving is produced. It is in many cases necessary to add corresponding additives, such as, for example, absorbers, in order to achieve a laser inscription.

However, there are also polymers which are intrinsically laser-markable and produce dark laser marks. These include, for example, PET, acrylonitrile-butadiene-styrene (ABS), polystyrene (PS), polyphenylene ether (PPO), liquid-crystal polymers (LCPs), polyphenylene sulfide (PPS), polyarylates, polyaryl sulfides, polyaryl sulfones and polyaryl ether ketones.

EP 0 959 101 discloses laser-markable pigments which consist of mineral pigments with a coating of chitin, where the chitin layer is destroyed by the high-energy radiation in the course of the laser marking.

In the cases described above, the polymer to be marked is in each case irradiated and absorbs the laser energy, where necessary also through addition of a pigment as further absorber. On incorporation into non-marking plastics, however, the latter likewise heat up in the direct vicinity of the irradiation site and decompose with surface destruction of the plastic. Atmospheric oxygen can enter through the damaged plastic surface, inducing further destruction of the polymer. This proves to be a disadvantage since the broken-open plastic layer scatters the light via the mark and thus reduces the contrast of the mark. In addition, smooth plastic surfaces are of interest.

An object of the present invention is therefore to provide laser-markable pigments which provide a high-contrast and good laser marking while simultaneously retaining the smooth surface of the polymer, and can be incorporated universally into the materials to be marked.

Surprisingly, it has been found that the laser-markable pigments according to the invention fully meet the complex requirement profile.

The invention therefore relates to laser-markable pigments which consist of an absorber which is coated with a marker. The direct contact of absorber and marking material results in a localized and high-contrast mark. In a preferred embodiment, the laser-markable pigment according to the invention comprises a diffusion barrier as additional layer. The diffusion barrier prevents the marker from being destroyed through ingress of air and damage to the polymer occurring. The use of the laser-markable pigments according to the invention thus also enables the laser marking of polymers which can otherwise only be marked with difficulty. The direct contact of absorber and marker produces high-contrast marks on irradiation. In addition, the marks produced using the pigments according to the invention are distinguished by a smooth surface, which confirms the efficiency of these pigments.

Suitable absorbers are laser-sensitive materials, such as, for example, fillers, inorganic pigments, including conductive pigments and/or effect pigments, and intrinsically markable polymers. Particularly suitable laser-sensitive materials are fillers, such as, for example, $TiO_2$ and $SiO_2$, or phyllosilicates. Suitable phyllosilicates here are, in particular, color-neutral natural muscovite mica. It is of course also possible to use other natural micas, such as phlogopite and biotite, synthetic mica, talc flakes and glass flakes. The term effect pigments is taken to mean all known luster pigments (metal-luster and pearlescent pigments), as marketed, for example, by Engelhard Corp., Eckart-Werke and Merck KGaA. Examples and embodiments of the above-mentioned pigments and pigment superstructures are also given, for example, in Research Disclosures RD 471001 and RD 472005, the disclosure contents of which are incorporated herein by way of reference.

Suitable conductive pigments are, for example, the pigments from Merck KGaA marketed under the trade name Minatec®. These are platelet-shaped mica pigments which comprise, as conductive layer, an outer layer of tin/antimony oxide. Suitable laser-sensitive pigments which may be mentioned here are furthermore the oxides, hydroxides, sulfides, sulfates and phosphates of metals, such as, for example, copper, bismuth, tin, zinc, silver, antimony, manganese, iron, nickel and chromium. Intrinsically marking polymers, such as, for example, polystyrene, polyvinyl carbonate and polyphenylene sulfide, are also suitable in their double function as marker and absorber.

Markers which can be employed in the laser-markable pigments according to the invention are intrinsically laser-markable polymers.

As a marker can be used any material which darkens or changes color to an extent evident to the human eye upon exposure to laser energy, particularly at a wavelength of 157 to 10600 nm. Examples include polyethylene terephthalate (PET), acrylonitrile-butadiene-styrene (ABS), polystyrene (PS), polyphenylene oxide (PPO), polyphenylene sulfide (PPS), polyethylene imine (PEI) and liquid-crystal polymers (LCPs), preferably PS and PPS. However, markers which can be used are also non-laser-sensitive polymers. Suitable for this purpose are readily coking polymers, such as, for example, PE and PP. The marker is of a different material than the absorber.

The proportion of marker in the laser-markable pigments according to the invention is preferably 1–90% by weight, more preferably 5–80% by weight and in particular 10–60% by weight, based on the laser-markable pigment.

Suitable diffusion barriers are materials which substantially prevent ingress of air to the inner pigment and do not otherwise significantly alter the pigments laser marking properties. Examples include flame retardants, such as, for example, ammonium phosphate, aluminum oxide hydrates, borates, antimony oxide, halogenated organic compounds, water-glass and ammonium polyphosphate. Preference is given to the use of water-glass and aluminum oxide hydrates.

The proportion of diffusion barrier is preferably 0–50% by weight, more preferably 1–20% by weight and in particular 2–10% by weight, based on the laser-markable pigment.

In order to prepare the laser-markable pigments according to the invention, the corresponding absorber is coated with the marker. Preferably, the absorber is fully covered by the marker but partial coverage is also possible. The invention therefore also relates to a process for the preparation of the laser-markable pigments in which the absorber is coated with a marker. In a further embodiment of the process according to the invention, the laser-markable pigment is additionally coated with a diffusion barrier, which preferably completely covers the pigment.

The coating of the absorber with the marker can be carried out in various ways. Thus, the coating can be achieved via polymerization of suitable monomers of the marker on the absorber surface. This polymerization can be carried out in all media known to the person skilled in the art, such as, for example, organic solvents. To this end, the absorber is suspended in the medium, and the polymerization is carried out. The laser-markable pigment can be separated off by all methods known to the person skilled in the art, such as, for example, drying, distillation or spray-drying. The parameters of the process according to the invention can be optimized in a manner known to the person skilled in the art.

Furthermore, the coating of the absorber with the marker can be achieved by suspending the absorber in polymer solutions. To this end, the polymer is dissolved in a suitable solvent, and the absorber is added. Removal of the solvent fixes the precipitating polymer to the absorber surface. This can be achieved by complete removal of the solvent by distillation, addition of a second solvent in which the polymer has lower solubility than in the original solvent, or by spray-drying the suspension. The process parameters can be optimized in a simple manner by the person skilled in the art.

Furthermore, the coating can also be achieved by mixing the absorber with a polymer melt. A prepared polymer melt is mixed with the pigment and cooled during the mixing process. Alternatively, the pigment can be suspended in the polymer melt and atomized. The optimum conditions can be selected in a manner known to the person skilled in the art.

The coating of the laser-markable pigments according to the invention with a diffusion barrier can be carried out in any manner known to the person skilled in the art. Preference is given to the use of wet-chemical methods.

Laser marking using the laser-markable pigments according to the invention can be carried out by incorporating them in all known thermoplastics, such as described, for example, in Ullmann, Vol. 15, pp. 457 ff., Verlag VCH. Suitable plastics to be provided with the pigments include, for example, polyethylene, polypropylene, polyamides, polyesters, polyester esters, polyether esters, polyphenylene ether, polyacetal, polybutylene terephthalate, polymethyl acrylate, polyvinyl acetate, polystyrene, acrylonitrile-butadiene-styrene, acrylonitrile-styrene-acrylate, polycarbonate, polyether sulfones, polyether ketones and copolymers and/or mixtures thereof.

The laser-markable pigments according to the invention are incorporated into the thermoplastic by known ways, for example, mixing the plastic granules with the laser-markable pigment and then shaping the mixture under the action of heat. During incorporation of the laser-markable pigments, adhesives which are known to the person skilled in the art, organic polymer-compatible solvents, stabilizers and/or surfactants which are temperature-stable under the working conditions can be added to the plastic granules. The pigmented plastic granules are generally prepared by a process in which the plastic granules are introduced into a suitable mixer and wetted with any additives, and the laser-markable pigment is then added and mixed in. The resultant mixture can then be processed directly in an extruder or an injection-molding machine. This is followed by the marking with suitable radiation.

During the marking, use is preferably made of high-energy radiation, generally in the wavelength range from 157 to 10600 nm, in particular in the range from 300 to 10600 nm. For example, mention may be made here of $CO_2$ lasers (10600 nm), Nd:YAG lasers (1064 or 532 nm) or pulsed UV lasers (excimer lasers). Particular preference is given to the use of Nd:YAG lasers and $CO_2$ lasers. The energy densities of the lasers employed are preferably in the range from 0.3 mJ/cm2 to 50 mJ/cm2, more preferably in the range from 0.3 mJ/cm2 to 10 mJ/cm2.

The inscription with the laser is preferably carried out by introducing the article into the ray path of a pulsed laser, preferably of an Nd:YAG laser. Inscription using a $CO_2$ or excimer laser is furthermore possible. However, the desired results can also be achieved using other types of laser which have a wavelength in a region of high absorption by the absorber. The resultant hue and color depth are determined by the laser parameters, such as the irradiation time and irradiation power. The power of the lasers used depends on the particular application and can readily be determined in each individual case by the person skilled in the art.

The laser-markable pigments according to the invention can be used in all plastics known to the person skilled in the art. The plastics pigmented in this way can be used, for example, as moldings in the electrical, electronics and automotive industries. A further important area of application for laser inscription is in identity cards and plastic marks for individual identification of animals. The proportion of laser-markable pigments in the plastic in the applications is preferably from 0.5 to 10% by weight, more preferably from 1 to 5% by weight and in particular from 1.5 to 3% by weight. The labeling and inscription of casings, lines, key caps, trim strips or functional parts in the heating, ventilation and cooling areas or switches, plugs, levers and handles which consist of the plastics pigmented with the pigments according to the invention can be carried out with the aid of laser light even in poorly accessible areas. The marks are distinguished by the fact that they are wipe- and scratch-resistant, stable during subsequent sterilization processes and can be applied in a hygienically pure manner during the marking process. The particular structure of the pigments prevents damage to the plastic to be marked. The multifarious material combinations allow individual matching of the properties of the pigments according to the invention to the particular application system and the radiation to be employed for the marking. The laser marking of plastic articles or moldings which comprise the pigments according to the invention is thus possible. The invention thus also relates to the use of the laser-markable pigments according to the invention for incorporation into polymers which are difficult to laser-mark, and to plastics comprising the laser-markable pigments according to the invention.

The following examples are intended to explain the invention in greater detail, but without limiting it.

The entire disclosures of all applications, patents and publications, cited herein and of corresponding German application No. 10252007.0, filed Nov. 6, 2002 are incorporated by reference herein.

EXAMPLES

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

Example 1

50 g of polystyrene powder granules are heated in 1250 ml of acetone and refluxed for one hour. The polystyrene which is still undissolved is removed by filtration. 50 g of Iriodin® 110 (pearl luster pigment of Merck KGaA. Darmstadt, Germany) are added to the filtrate, and the mixture is stirred at 40° C. for one hour. The solvent is subsequently distilled off at 55° C. to a total amount of 250 ml and recovered. 250 ml of water are then added, and the acetone is distilled off further until no further distillate is formed. The suspension is filtered off with suction and washed with 500 ml of water. The drying of the filter cake is carried out at 110° C. over a period of 15 hours. The powder is then deagglomerated in a 100 µm sieve.

200 g of polypropylene granules are mixed with 0.4 g of DOP, then 1 g of the above-described pigment is added and likewise mixed. The mixture is then heated in a screw extruder, and platelets are produced. The plastic platelets are inscribed using an Nd:YAG laser (wavelength 1064 nm).

The result is a deep-black mark and a relatively smooth plastic surface.

Example 2

50 g of polystyrene powder granules are heated in 1250 ml of acetone and refluxed for one hour. The polystyrene which is still undissolved is removed by filtration. 50 g of Iriodin® 110 are added to the filtrate, and the mixture is stirred at 40° C. for one hour. The solvent is subsequently distilled off at 55° C. to a total amount of 250 ml and recovered. 250 ml of water are then added, and the acetone is distilled off further until no further distillate is formed. The suspension is filtered off with suction and washed with 500 ml of water. The drying of the filter cake is carried out at 110° C. over a period of 15 hours. The powder is then deagglomerated in a 100 µm sieve. For coating with SiO2, the powder is resuspended in 1000 ml of water and heated to 75° C., and the pH of the suspension is set to 9.0 by addition of sodium hydroxide solution (16%). Sodium water-glass solution (8.2% by weight, based on SiO2) is added dropwise to the suspension with stirring, and the pH is kept constant by addition of 14.4% HCl solution. After addition of 50 ml of sodium water-glass solution, the mixture is stirred for a further 30 minutes, and the suspension is filtered off with suction, washed with 1000 ml of water and dried at 110° C. for 15 hours.

200 g of polypropylene granules are mixed with 0.4 g of DOP, then 1 g of the above-described pigment is added and likewise mixed. The mixture is then heated in a screw extruder, and platelets are produced. The plastic platelets are inscribed using an Nd:YAG laser (wavelength 1064 nm).

The result is a deep-black mark and a relatively smooth plastic surface.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A laser-markable pigment, which comprises an absorber which is coated with a marker, and which is additionally coated on the outside with a diffusion barrier, wherein the absorber and marker are different materials, wherein the absorber is an inorganic pigment or a filler and wherein the marker is an intrinsically laser-markable polymer selected from the group consisting of a polyethylene terephthalate, an acrylonitrile-butadiene-styrene, a polystyrene, a polyphenylene ether, a liquid-crystal polymer and a polyphenylene sulfide.

2. A laser-markable pigment according to claim 1, wherein the absorber is $TiO_2$, a conductive pigment and/or an effect pigment.

3. A laser-markable pigment according to claim 1, wherein the absorber is $SiO_2$ and/or a phyllosilicate.

4. A laser-markable pigment according to claim 1, wherein the diffusion barrier is a flame retardant.

5. A laser-markable pigment according to claim 4, wherein the diffusion barrier is ammonium phosphate, aluminum oxide hydrate, zinc borate, antimony oxide, waterglass or ammonium polyphosphate.

6. A process for the preparation of a laser-markable pigment according to claim 1, which comprises coating the absorber with the marker.

7. A process according to claim 6, further comprising coating the marker-coated absorber with a diffusion barrier.

8. A laser-markable plastic composition which comprises a plastic which is not laser-markable and a laser-markable pigment according to claim 1.

9. A plastic molded article composed of a plastic composition of claim 8.

10. A laser-markable plastic composition according to claim 8, wherein the proportion of laser-markable pigment is from 0.5 to 10% by weight, based on the laser-markable plastic composition as a whole.

11. A plastic molded article of claim 9, wherein the proportion of laser-markable pigment in the article is 0.5 to 10% by weight.

* * * * *